US010148492B2

(12) United States Patent
Chawla et al.

(10) Patent No.: US 10,148,492 B2
(45) Date of Patent: *Dec. 4, 2018

(54) DATA CENTER BRIDGING NETWORK CONFIGURATION AND MANAGEMENT

(71) Applicant: Dell Products L.P., Round Rock, TX (US)

(72) Inventors: Gaurav Chawla, Austin, TX (US); Rajesh Narayanan, San Jose, CA (US); Shyamkumar T. Iyer, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/069,665

(22) Filed: Mar. 14, 2016

(65) Prior Publication Data
US 2016/0197775 A1 Jul. 7, 2016

Related U.S. Application Data

(63) Continuation of application No. 13/946,669, filed on Jul. 19, 2013, now Pat. No. 9,288,120.

(51) Int. Cl.
G06F 15/177 (2006.01)
H04L 12/24 (2006.01)
(Continued)

(52) U.S. Cl.
CPC ...... H04L 41/0803 (2013.01); H04L 41/5035 (2013.01); H04L 41/5077 (2013.01);
(Continued)

(58) Field of Classification Search
CPC ... H04L 41/0803; H04L 41/082; H04L 41/12; H04L 43/0829; H04L 47/10; H04L 47/11;
(Continued)

(56) References Cited

U.S. PATENT DOCUMENTS 8,345,697 B2 * 1/2013 Kotha ............... H04L 45/66
370/401
8,576,715 B2 * 11/2013 Bloch ............... H04L 45/38
370/235
(Continued)

OTHER PUBLICATIONS

Victor Lama; "Understanding Enhanced Transmission Selection;" Mar. 23, 3011; IEEE 802.1Qaz.

Primary Examiner — Jungwon Chang
(74) Attorney, Agent, or Firm — Haynes and Boone, LLP

(57) ABSTRACT

A Data Center Bridged (DCB) Information Handling System (IHS) network include a plurality of switch IHSs that are connected together to provide the IHS network, and a management IHS coupled to each of the plurality of switch IHSs through a management network. The management IHS is configured to identify a plurality of data traffic flows and, for each identified data traffic flow, to determine a flow path through the IHS network. The flow paths include at least some of the plurality of switch IHSs, and the management IHS provides configuration information to each of the switch IHSs included in a flow path such that a quality of service (QoS) is provided for the data traffic flow along that flow path through the DCB IHS network according to the configuration information. Thus, the systems and methods utilize flow based networking to configure and manage DCB IHS networks.

20 Claims, 6 Drawing Sheets

(51) Int. Cl.
    *H04L 12/851*     (2013.01)
    *H04L 12/801*     (2013.01)
    *H04L 12/803*     (2013.01)
    *H04L 12/26*     (2006.01)

(52) U.S. Cl.
    CPC ...... *H04L 43/0829* (2013.01); *H04L 43/0882* (2013.01); *H04L 47/10* (2013.01); *H04L 47/11* (2013.01); *H04L 47/125* (2013.01); *H04L 47/24* (2013.01); *H04L 41/5019* (2013.01)

(58) Field of Classification Search
    CPC ......... H04L 47/24; H04L 45/26; H04L 45/38; H04L 45/124; H04L 41/0213; H04L 41/5035; H04L 41/5077; H04L 41/5019; H04L 47/125; H04L 43/0882; G06F 9/00
    USPC ........ 709/220, 230; 370/235, 238, 230, 400, 370/395.31, 401
    See application file for complete search history.

(56) References Cited

U.S. PATENT DOCUMENTS

| | | | |
|---|---|---|---|
| 9,094,235 B2* | 7/2015 | Janardhanan | H04L 12/4625 |
| 9,218,303 B2* | 12/2015 | Chandrasekhar | G06F 9/00 |
| 9,288,120 B2* | 3/2016 | Chawla | H04L 47/24 |
| 2011/0176551 A1* | 7/2011 | Chawla | H04L 41/0213 370/395.31 |
| 2012/0110656 A1 | 5/2012 | Santos et al. | |
| 2012/0275301 A1* | 11/2012 | Xiong | H04L 49/357 370/230 |
| 2012/0300669 A1* | 11/2012 | Zahavi | H04L 45/124 370/254 |
| 2012/0314715 A1 | 12/2012 | Janardhanan | |
| 2013/0100809 A1* | 4/2013 | Gale | H04L 41/082 370/235 |
| 2013/0128746 A1* | 5/2013 | Yedavalli | H04L 45/38 370/238 |
| 2013/0223442 A1 | 8/2013 | Narayanan et al. | |
| 2014/0052836 A1 | 2/2014 | Nguyen et al. | |
| 2014/0140348 A1* | 5/2014 | Perlman | H04L 45/26 370/400 |
| 2014/0177447 A1 | 6/2014 | Venkataswami et al. | |
| 2014/0204738 A1* | 7/2014 | Carter | H04L 41/12 370/230 |
| 2014/0254406 A1 | 9/2014 | Anumala et al. | |
| 2014/0270764 A1* | 9/2014 | Decusatis | H04Q 11/0071 398/46 |
| 2015/0026313 A1 | 1/2015 | Chawla et al. | |
| 2016/0036706 A1* | 2/2016 | Hiscock | H04L 12/462 370/230 |

\* cited by examiner

DATA CENTER BRIDGING NETWORK CONFIGURATION AND MANAGEMENT

CROSS-REFERENCE TO RELATED APPLICATIONS

This is a Continuation application to U.S. Utility application Ser. No. 13/946,669 filed Jul. 19, 2013, entitled "DATA CENTER BRIDGING NETWORK CONFIGURATION AND MANAGEMENT," the disclosure of which is incorporated herein by reference in their entirety.

BACKGROUND

The present disclosure relates generally to information handling systems (IHSs), and more particularly to systems and methods for configuring and managing a Data Center Bridging (DCB) IHS network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Data Center Bridging (DCB) refers to a set of enhancements to Ethernet networks (e.g., local area networks (LANs) for use in data center environments. For example, for selected traffic in the network, DCB attempts to eliminate loss due to queue overflow and to allocate bandwidth on links. The configuration and management of IHS networks that utilize DCB raises a number of issues.

For example, in large-scale, multi-hop networks such as cloud networking environments, DCB becomes very complicated to configure and manage. Network administrators are forced to configure each Network Interface Controller (NIC) and switch port in the system, and just a few of the details involved in configuring and managing a DCB network include configuring switch ports for DCB exchange (DCBX), recovering from failures/notifications resulting from DCBX link-level exchanges (conventional DCB configuration is peer-to-peer using the Link Layer Discovery Protocol (LLDP) via TLV units), and managing DCB parameters at each switch port in the DCB network, as well as at the ports on endpoint devices connected to the DCB network. Furthermore, making changes to DCB configuration following the initial configuration of a DCB network is very difficult, as a network administrator must manually make such configuration changes on all of the ports that connect a first endpoint device to a second endpoint device. Such complications and difficulties result in many network administrators deciding not to deploy Remote Direct Memory Access (RDMA) over Converged Ethernet (RoCE), Fibre Channel over Ethernet (FCoE), Internet Small Computer System Interface (iSCSI), and/or other network protocols with DCB enabled on their networks, as despite the ability of DCB to provide lossless behavior and Quality of Service (QoS) capabilities, the configuration/management hurdles become too high and networks with dynamically adjusting requirements become too burdensome.

Accordingly, it would be desirable to provide an improved DCB network system.

SUMMARY

According to one embodiment, an information handling system (IHS) network includes a plurality of switch IHSs that are connected together to provide an IHS network; a management IHS coupled to each of the plurality of switch IHSs through a management network, wherein the management IHS is configured to identify a plurality of data traffic flows and, for each identified data traffic flow, to: determine a flow path through the IHS network, wherein the flow path includes at least some of the plurality of switch IHSs; and provide configuration information to each of the switch IHSs included in the flow path such that a quality of service (QoS) is provided for the data traffic flow along the flow path through the IHS network according to the configuration information.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
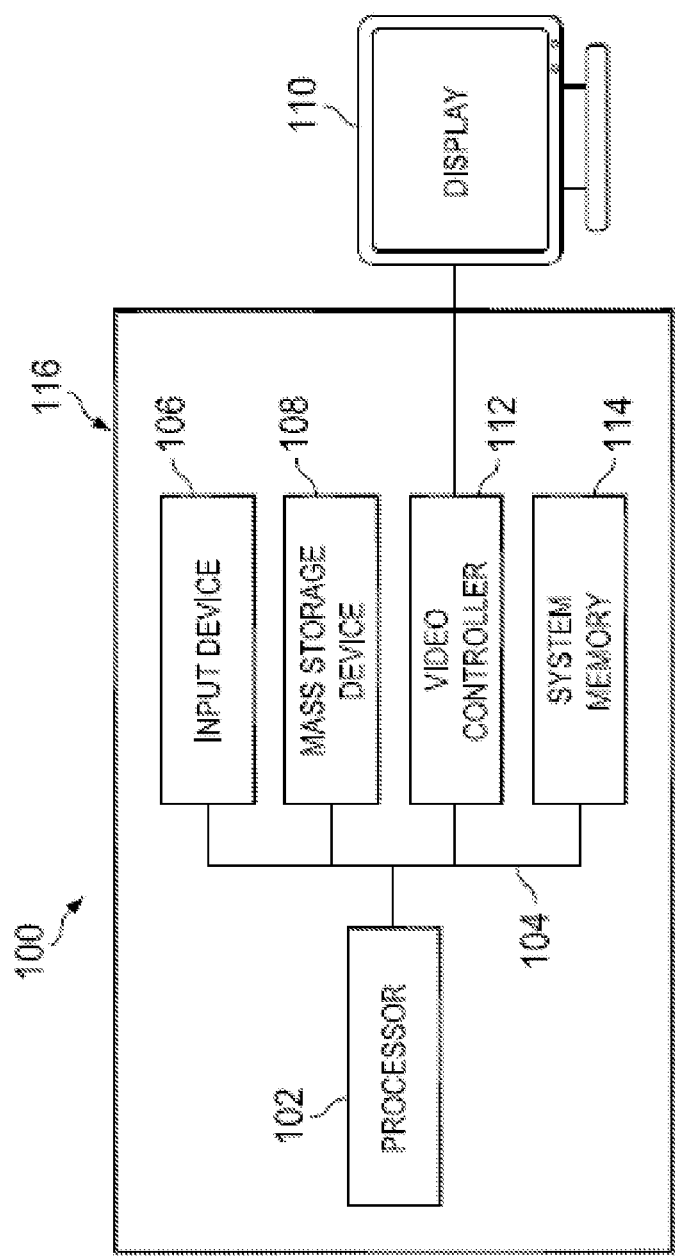
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
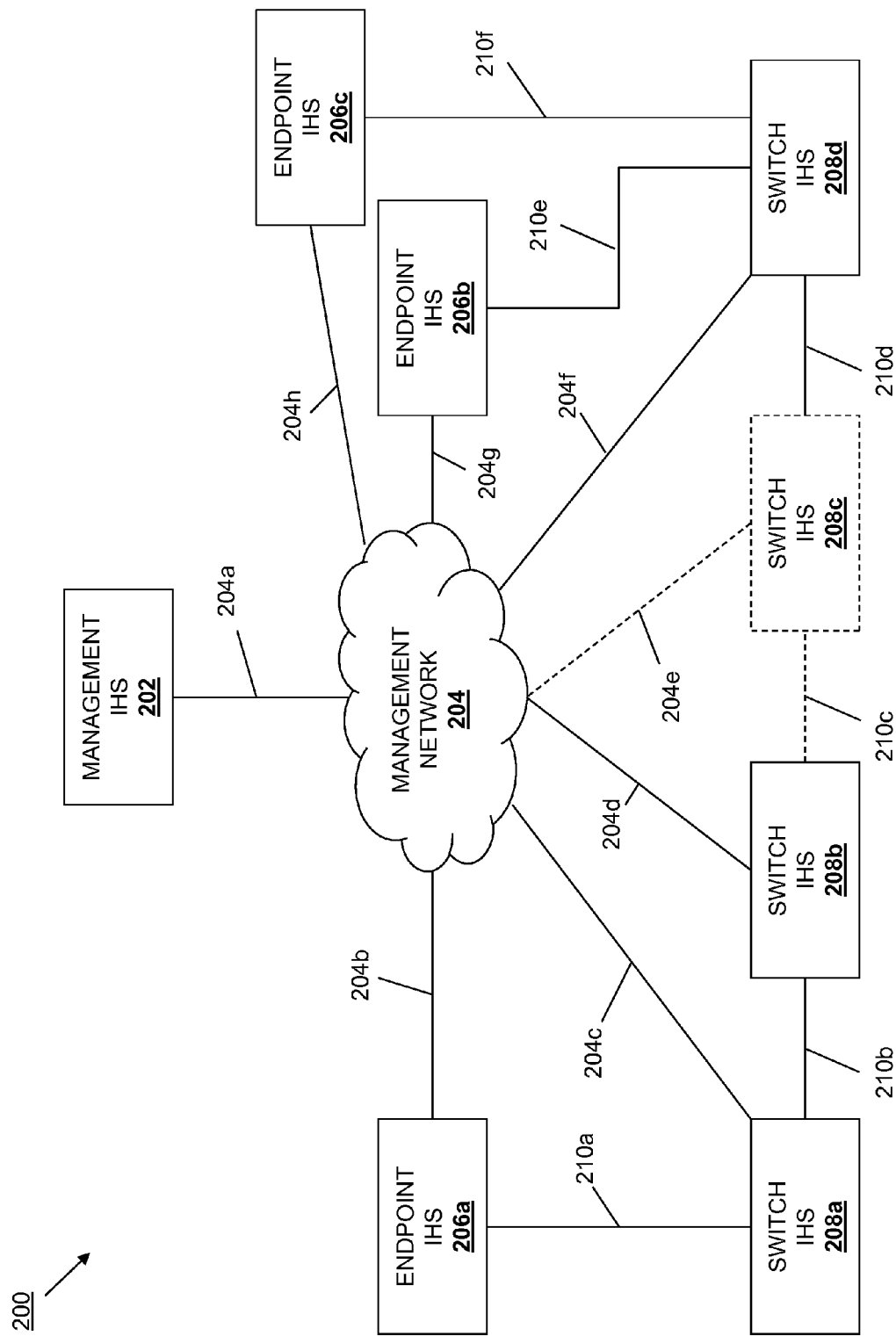
FIG. 2 is a schematic view illustrating an embodiment of an IHS network.

Referring now to FIG. 2, an embodiment of an IHS network 200 is illustrated. In the embodiments discussed below, the IHS network 200 may be configured to provide a Data Center Bridging (DCB) IHS network that include an enhanced Ethernet local area network (LAN) utilized in a multi-hop data center environment such as, for example, a cloud network environment. However, some of the teachings provided herein may be applied to non-DCB IHS networks as well without departing from the scope of the present disclosure. The IHS network 200 includes a management IHS 202 which may be, for example, the IHS 100 discussed above with reference to FIG. 1, and may include some or all of the components of the IHS 100. In the embodiments discussed below, the management IHS 202 is a server IHS that includes a processor (not illustrated, but which may be the processor 102 discussed above with reference to FIG. 1) and a non-transitory memory (not illustrated, but which may be the storage device 108 and/or the system memory 114 discussed above with reference to FIG. 1) that includes instructions that, when executed by the processor, cause the processor to perform the functions of the management IHS 202 discussed below. For example, the management IHS 202 may provide a software-defined networking (SDN) controller, or other embedded management controller, that performs the functions discussed below. The management IHS 202 may be coupled to a management network 204 through, for example, a link 204a between a management port on a management network interface controller (NIC) and the management network 204.

The IHS network 200 also includes a plurality of coupled IHSs that includes a plurality of endpoint IHSs 206a, 206b, and 206c, and a plurality of switch IHSs 208a, 208b, 208c, and up to 208d. While only three endpoint IHSs and four switch IHSs are illustrated for clarity of discussion and illustration, one of skill in the art will recognize that a multi-hop data center environment may include any number of endpoint IHSs and any number of switch IHSs. Furthermore, while only switch IHSs are illustrated, other packet handling IHSs may be included in the IHS network 200 without departing from the scope of the present disclosure.

In an embodiment, the endpoint IHSs 206a, 206b, and/or 206c may include physical server IHSs, virtual machines located on one or more server IHSs, storage systems such as Internet Small Computer System Interface (iSCSI) storage arrays, Fibre Channel over Ethernet (FCoE) storage arrays, Network-Attached Storage (NAS) platforms, backup storage appliances, and cloud storage gateways, network devices such as routers, load balancers, firewalls, and security devices, and/or a variety of other data center environments IHSs known in the art. Each of the endpoints IHSs 206a, 206b, and 206c, as well as the switch IHSs 208a, 208b, 208c, and 208d, are coupled to the management network 204 through links 204b, 204c, 204d, 204e, 204f, 204g, and 204h, respectively, between the management network 204 and, for example, management ports located on onboard NICs on each of the endpoints IHSs 206a, 206b, and 206c, as well as the switch IHSs 208a, 208b, 208c, and 208d. Furthermore, the endpoint IHS 206a is coupled to the switch IHS 208a through a link or links 210a between, for example, traffic ports located on add-on NICs in each of the IHS 206a and the switch IHS 208a. Similarly, the switch IHS 208a is coupled to the switch IHS 208b by a link or links 210b, the switch IHS 208b is coupled to the switch IHS 208c by a link or links 210c, the switch IHS 208c is coupled to the switch IHS 208d by a link or links 210d, and the switch IHS 208d is coupled to the endpoint IHSs 206b and 206c by a link or links 210e and 210f, respectively.

Figure 3:
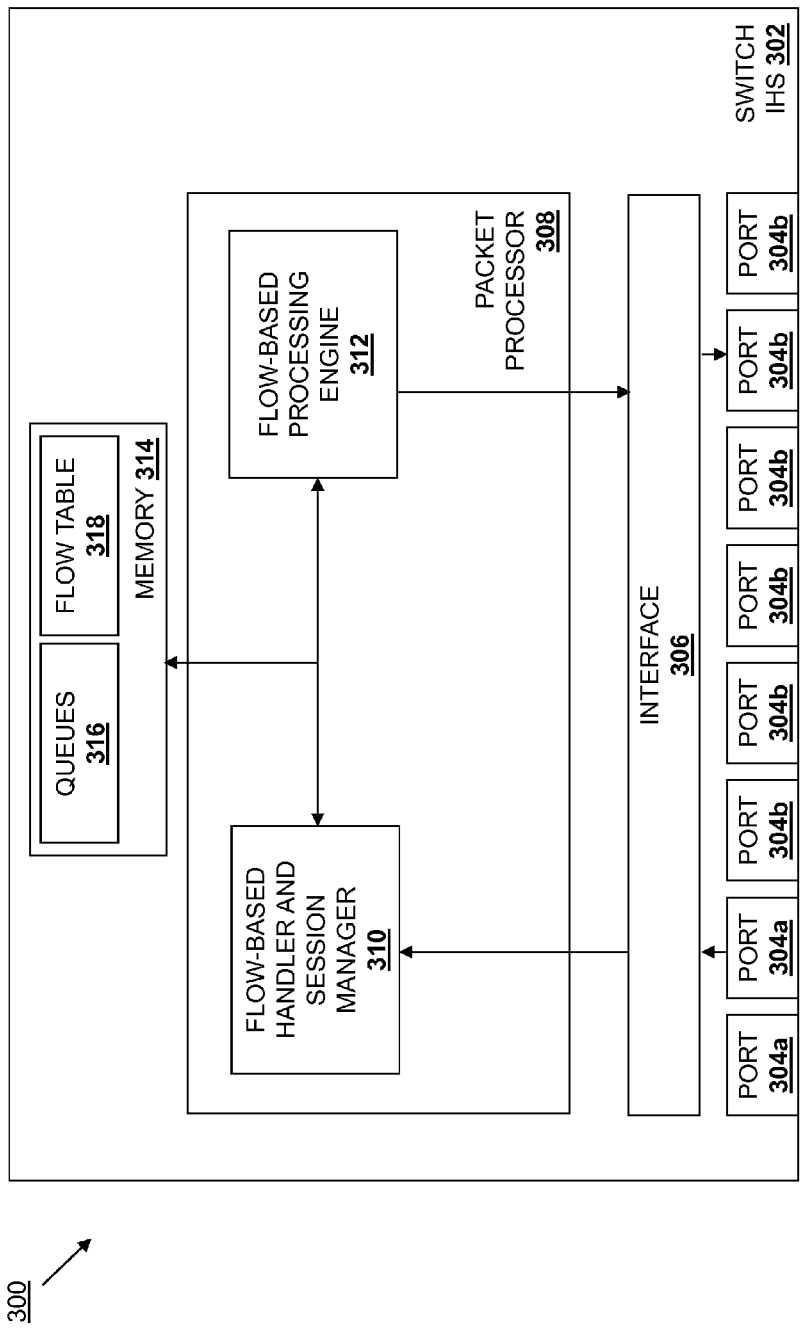
FIG. 3 is a schematic view illustrating an embodiment of a switch IHS in the IHS network of FIG. 2.

Referring now to FIG. 3, a flow-based networking device 300 is illustrated that, in the embodiments discussed below, is a flow-based networking switch IHS 302. In an embodiment, the switch IHS 302 may be the IHS 100, described above with reference to FIG. 1, and may include some or all of the components of the IHS 100. In an embodiment, the switch IHS may include route processing managers, line modules, switch fabric, and/or in a variety of other network components known in the art. The switch IHS 302 includes a plurality of ports 304 that include management ports 304a and Ethernet/traffic ports 304b. The ports 304 are each coupled to an interface 306 that may include, for example, a Media Interface with physical (PHY) and link (MAC) layers. The interface 306 couples the ports 304 to a packet processor 308 which, in an embodiment, may be a flow-based packet processing chip such as, for example, a chip that has been optimized to inspect and classify application layer packet information (as opposed to convention packet processing chips that process packets based on layer-2 and layer-3 data). The packet processor 308 includes a flow-based handler and session manager 310 and a flow-based processing engine 312. Each of the flow-based handler and session manager 310 and the flow-based processing engine 312 are coupled to the interface 306. The flow-based handler and session manager 310 and the flow-based processing engine 312 are coupled to each other and to a memory 314. In some embodiments, the memory 314 may be external to the packet processor 308 and coupled to at least one core of the packet processor 308 through a high speed memory bus. The memory 314 includes a plurality of queues 316 (e.g., hardware queues) and a data traffic flow table 318. The data traffic flow table 318 may include a plurality of flow match rules, discussed in further detail below. While not illustrated in detail, one of skill in the art will recognize that the switch IHS 302 may include one or more non-transitory, computer-readable mediums that are coupled to the packet processor 308 and include instructions that, when executed by the packet processor 308, cause the packet processor 308 to provide the functions of the flow-based handler and session manager 310 and the flow-based processing engine 312.

The packet processor 308 is configured to provide flow-based networking functionality for the switch IHS 302 by performing packet flow metadata search, inspection, collection, and processing by retrieving metadata from packet flow headers pertaining to application flow match requirements (e.g., signatures, data types, application policies, forwarding, modification rules, and/or a variety of other application flow match requirements known in the art.) The flow-based networking architecture illustrated in FIG. 3 may be leveraged for access network designs, aggregation network designs, and a variety of other network designs known in the art. The flow-based processing provided by the switch IHS 302 addresses next-generation network architecture that requires intensive and high performance packet processing of content aware applications and services at line rate speeds, while providing programmable deep packet inspection and classification of complex data types of flow-based services designed into emerging technologies (e.g., the OpenFlow protocol, L4-L7 protocols, security and filtering, traffic management, load balancing, rate shaping, and/or a variety of other emerging technologies known in the art.)

While not discussed in detail herein, the flow based processing performed by the switch IHS 302 includes, for example, any or all of: assembling received packet data into packets, performing a deep inspection on packet headers in the packets to retrieve metadata, and comparing that metadata to flow match rules that are stored in the data traffic flow table 318 to determine whether the packets match a data traffic flow that is associated with one or more of the flow match rules that are stored in the data traffic flow table 318. Data traffic flows may be tracked, monitored, and maintained, and packets received may be matched to data traffic flows until a data traffic flow session stop indicator is received. As discussed below, in the IHS network 200, the flow-based networking functionality of the switch IHSs is leveraged to provide seamless and dynamic DCB management in a large-scale multi-hop network.

Figure 4:
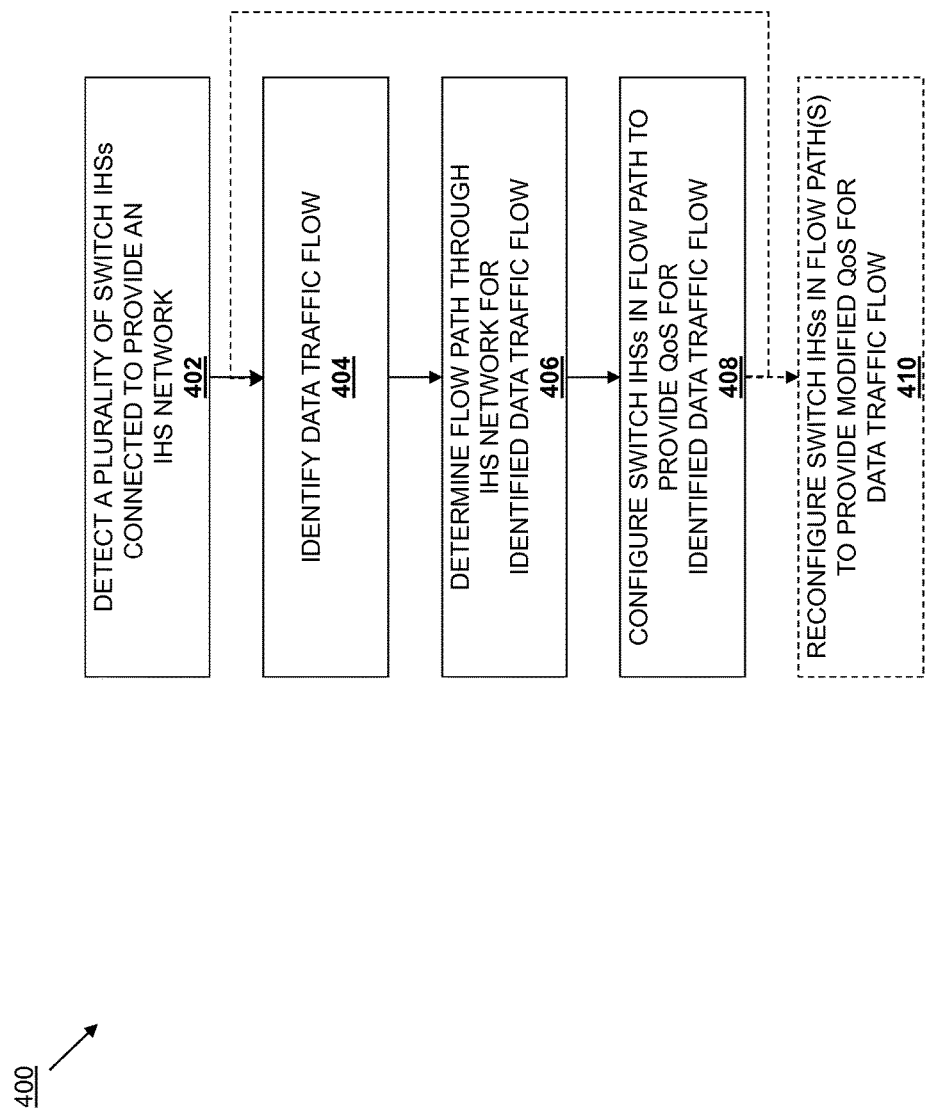
FIG. 4 is a flow chart illustrating an embodiment of a method for providing a DCB IHS network.

Referring now to FIGS. 2 and 4, an embodiment of a method 400 for providing a DCB IHS network is illustrated. As discussed further according to some of the embodiments detailed below, Software Defined Networking (SDN) or flow-based networking is leveraged to configured and manage DCB in the IHS network 200. For example, an SDN controller in the management IHS 202 is provided a full view through the management network 204 of the topology of the IHS network 200 (e.g., the endpoint IHSs 206a-c, the switch IHSs 208a-d, and/or other components in the network), and may use a combination of the OpenFlow communication protocol and extension application programming interfaces (APIs) to configure and manage DCB on any endpoint IHS-to-endpoint IHS path through the IHS network 200. In many embodiments, this may negate the need to provide support for DCB exchange (DCBX) and priority tagging of Ethernet frames in endpoint IHSs, workloads, and/or operating systems. Instead, data traffic flows may be mapped directly to the DCB priority hardware queues in the switch IHSs to allow the switch IHSs to enforce lossless Ethernet and quality of service (QoS) policies for those data traffic flows.

Prior to the method 400 a network administrator may provide one or more DCB configurations in the management IHS 202. In an embodiment, a DCB application and user interface, an example of which is illustrated and described below with reference to FIGS. 5a and 5b, may be provided on the management IHS 202 that allows a network administrator or other user of the IHS network to provide a plurality of DCB configuration details that may include the identity of data traffic flows, priorities for data traffic flows, bandwidth allocations for data traffic flows, lossless behavior requests for data traffic flows, congestion notification requests for data traffic flows, and/or a variety of other DCB configuration information known in the art.

The method 400 begins at block 402 where a plurality of switch IHSs that are connected together to provide an IHS network are detected. In an embodiment of block 402, the management IHS 202 detects the plurality of switch IHS2 208a, 208b, 208c, and 208d through the management network 204. For example, each of the switch IHSs 208a-d in the IHS network 200 may register through the management network 204 with the SDN controller in the management IHS 202. In some examples, the management IHS 202 may communicate with the endpoint IHSs 206a, 206b, and/or 206c at block 402 as well to determine their location and connectivity to the IHS network 200. In this manner, the SDN controller in the management IHS 202 is provided a full view of the IHS network 200 including each of the switch IHSs and the network topology.

The method 400 then proceeds to block 404 where a data traffic flow is identified. In an embodiment, an endpoint IHS such as the endpoint IHS 206b or the endpoint IHS 206c may start an application that begins a flow session associated with a data traffic flow, and at block 404 of the method 400, the management IHS 202 may communicate with the switch IHS that is in the data path of a flow session and identify the data traffic flow associated with that flow session. In such an embodiment, the data traffic flow identified at block 404 of the method 400 includes information about the endpoint IHS sending the data traffic flow, the endpoint IHS receiving the data traffic flow, the type of data traffic included in the data traffic flow, and/or a variety of other data traffic flow information known in the art. In another embodiment, a data traffic flow may be identified by the network administrator or other user prior to the method 400, as discussed above.

The method 400 then proceeds to block 406 where a flow path is determined through the IHS network for the identified traffic flow. In an embodiment, the management IHS 202 may use any of the information received about the data traffic flow identified at block 404 of the method 400 to determine a flow path through the IHS network 200 for that data traffic flow. For example, the management IHS 202 may use the information about the endpoint IHS 206b sending the data traffic flow and the endpoint IHS 206a receiving the data traffic flow to determine that a flow path exists for the identified data traffic flow between the endpoint IHSs 206b and 206a that includes the link or links 210e, the switch IHS 208d, the link or links 210d, the switch IHS 208c, the link or links 210c, the switch IHS 208b, the link or links 210b, the switch IHS 208a, and the link or links 210a.

In an embodiment, a plurality of flow paths may be available through the IHS network 200, and the selection of a particular flow path from the plurality of flow paths may be based on the switch IHSs included in the flow path (e.g., switch IHSs with bandwidth to support the identified data traffic flow, switch IHSs that support DCB, switch IHSs that are flow-based networking switch IHSs, etc.), the information received about the type of data traffic included in the identified data traffic flow (e.g., a bandwidth needed for the identified data traffic flow, a QoS requested for the identified data traffic flow, etc.) In another embodiment, a flow path may be identified that includes only switch IHSs that are flow-based networking switch IHSs, and those switch IHSs may be selected to provide the flow path. In other embodiments, combinations of flow-based networking switch IHSs and non-flow-based networking switch IHSs may be selected for the flow path. In some embodiments, the management IHS 202 may determine that a switch IHS includes at least one DCB capable Ethernet/traffic port before selecting that switch IHS for a flow path. While a few examples have been provided, the determination of a flow path for the identified data traffic flow may be based upon a variety of other information known in the art for routing a data traffic flow between endpoint IHSs.

The method 400 then proceeds to block 408 where the switch IHSs in the flow path determined at block 406 are configured to provide a first QoS for the data traffic flow identified at block 404. In an embodiment, at block 406, the management IHS 202 sends configuration information to each of the switch IHSs in the flow path determined at block 406, and that configuration information causes those switch IHSs to provide a first QoS to the data traffic flow identified at block 404. In the examples discussed below, the flow path discussed with regard to the configuration at block 406 is the flow path between the endpoint IHSs 206b and 206a that includes the link or links 210e, the switch IHS 208d, the link or links 210d, the switch IHS 208c, the link or links 210c, the switch IHS 208b, the link or links 210b, the switch IHS 208a, and the link or links 210a. However, configuration of any flow path determined by the management IHS 202 may be similar to that discussed below.

In an embodiment, the configuration at block 408 includes the management IHS 202 programming the data traffic flow identified at block 404 into each of the flow-based networking switch IHSs that are included in the flow path determined at block 406. For example, the SDN controller in the management IHS 202 may provide configuration information that includes the details of the data traffic flow identified at block 404 to each of the switch IHSs 208a-d through the management network 204. In response to receiving the details of the data traffic flow identified at block 404, the switch IHSs 208a-d may store those details in the data traffic flow table 318 such that the data traffic flow identified at block 404 may be recognized when received at the Ethernet/traffic ports on the switch IHSs 208a-d.

In an embodiment, the configuration at block 408 is enabled by extending the conventional OFPT_PORT_MOD controller command message type in the OpenFlow communications protocol (conventionally used to change buffer sizes of Ethernet/traffic ports in the switch IHSs that are managed by the SDN controller) to allow an SDN controller in the management IHS 202 to use OFPT_PORT_MOD messages to send a DCB configuration to any of the switch IHSs 208a-d in the flow path determined at block 408 of the method 400. Thus, at block 408 of the method 400, the SDN controller in the management IHS 202 may send OFPT_PORT_MOD messages to each of the switch IHSs 208a-d that include configuration information that the switch IHSs 208a-d may use to provide QoS to the data traffic flow identified in block 404.

In an embodiment, configuration information provided from the management IHS 202 to the switch IHSs 208a-d includes data traffic flow bandwidth information that may specify to the switch IHSs a bandwidth to provide the data traffic flow identified at block 404. For example, data traffic flow bandwidth information may specify to a switch IHS a percentage of the total bandwidth available to that switch IHS that should be provided the data traffic flow identified at block 404, a bandwidth amount that should be provided the data traffic flow identified at block 404, and/or a variety of other bandwidth allocations known in the art. In an embodiment, configuration information provided from the management IHS 202 to the switch IHSs 208a-d includes data traffic flow priority information that may specify to the switch IHSs a priority to provide the data traffic flow identified at block 404. For example, data traffic flow priority information may specify to a switch IHS a priority that that should be provided the data traffic flow identified at block 404 relative to any other traffic flows received by that switch IHS.

In an embodiment, configuration information provided from the management IHS 202 to the switch IHSs 208a-d includes loss/lossless behavior information that may specify to the switch IHSs whether loss or lossless behavior should be provided to the data traffic flow identified at block 404. For example, loss/lossless behavior information may specify to a switch IHS whether packets of the data traffic flow identified at block 404 may be dropped, or whether each packet of the data traffic flow must be delivered. In an embodiment, configuration information provided from the management IHS 202 to the switch IHSs 208a-d includes congestion information that allows the switch IHSs to send congestion notification messages to endpoint IHSs to slow down or pause the sending of the data traffic flow identified at block 404 when an output queue or buffer space in the switch IHSs begins to get full.

Upon receipt of the configuration information, each of the switch IHSs in the flow path determined at block 406 may be configured using the configuration information. For example, upon receipt of the OFPT_PORT_MOD messages from the SDN controller in the management IHS 202, each of the switch IHSs 208a-d may be configured using the configuration information in those messages to program DCB parameters associated with their DCB capable Ethernet/traffic ports that provide the flow path determined at block 406 by using the configuration information to program their hardware queues (e.g., the queues 316 discussed above with reference to the switch IHS 302.) For example, table A below illustrates a hardware queue of a switch IHS that has been programmed with configuration information for two data traffic flow (1 and 2):

| cap | | 8 | | | cbs | | | 0 |
|---|---|---|---|---|---|---|---|---|
| data traffic flow | 1 | 2 | 3 | 4 | 5 | 6 | 7 | 8 |
| ets tc_tx_bw | 90 | 10 | 0 | 0 | 0 | 0 | 0 | 0 |
| ets tc_rx_bw | 90 | 10 | 0 | 0 | 0 | 0 | 0 | 0 |
| ets tc_tsa | 2 | 2 | 0 | 0 | 0 | 0 | 0 | 0 |
| ets prio_tc | 0 | 1 | 2 | 0 | 0 | 0 | 0 | 0 |

As can be seen in table A above, the hardware queue for the switch IHS has been programmed to handle a maximum number of 8 data traffic flows (cap=8), and the configuration information provided at block 406 has allocated 90% of the transmission bandwidth of the switch IHS to data traffic flow 1 (ets tc_tx_bw=90) and 10% of the transmission bandwidth of the switch IHS to data traffic flow 2 (ets tc_tx_bw=10). Similarly, the configuration information provided at block 406 has allocated 90% of the receiving bandwidth of the switch IHS to data traffic flow 1 (ets tc_tx_bw=90) and 10% of the receiving bandwidth of the switch IHS to data traffic flow 2 (ets tc_tx_bw=10). The configuration information provided at block 406 has also prioritized data traffic flow 1 (ets prio_tc=0) over data traffic flow 2 (ets prio_tc=1), and prioritized data traffic flow 2 over other data traffic flows (ets prio_tc=2) received by the switch IHS. The configuration information provided at block 406 also includes the provision of a traffic class for a transmission selection algorithm (ets tc_tsa=2) for both data traffic flow 1 and data traffic flow 2, which is used to allow excess bandwidth allocated but not being used by a particular data traffic flow or traffic class to be used by another data traffic flow or traffic class.

As illustrated in the method 400, the method 400 may loop back through blocks 404, 406, and 408 such that the management IHS 202 identifies a plurality of a data traffic flows and, for each data traffic flow, determines a flow path through the IHS network 200 and configures the switch IHSs in that flow path to provide a QoS for the data traffic flow. Thus, a first data traffic flow may be identified, a first flow path through the IHS network determined for the first data traffic flow, and the switch IHSs in the first flow path configured to provide a first QoS for the first data traffic flow; followed by a second data traffic flow being identified, a second flow path through the IHS network determined for the second data traffic flow, and the switch IHSs in the second flow path configured to provide a second QoS for the second data traffic flow; and so on. Table A provided above and illustrating the hardware queue in a switch IHS includes a situation in which each of a first data traffic flow and a second data traffic flow have been identified (data traffic flow 1 and data traffic flow 2 in the table), a first flow path for the first data traffic flow and a second flow path for the second data traffic flow determined that each include that switch IHS, and the switch IHS configured to provide a first QoS for the first data traffic flow (90% transmission and receive bandwidth and highest priority for data traffic flow 1) and a second QoS for the second data traffic flow (10% transmission and receive bandwidth and lower priority for data traffic flow 2 relative to data traffic flow 1).

Using the table provided above illustrating the hardware queue in a switch IHS that has been configured according to the method 400, the operation of the IHS network 200 to provide data traffic flows between endpoint IHSs may be described. In this example, data traffic flow 1 in the table is sent from endpoint IHS 206b to endpoint IHS 206a over a flow path that includes the link or links 210e, the switch IHS 208d, the link or links 210d, the switch IHS 208c, the link or links 210c, the switch IHS 208b, the link or links 210b, the switch IHS 208a, and the link or links 210a. Similarly, data traffic flow 2 in the table is sent from endpoint IHS 206b to endpoint IHS 206a over the same flow path that includes the link or links 210e, the switch IHS 208d, the link or links 210d, the switch IHS 208c, the link or links 210c, the switch IHS 208b, the link or links 210b, the switch IHS 208a, and the link or links 210a. This example also includes each switch IHS 208a-d configured the same (i.e., the hardware queues programmed as detailed in table A above.)

In operation, each switch IHS 208a-d operates to receive both data traffic flow 1 and data traffic flow 2 (e.g., from the endpoint IHSs 206b and 206c or from other switch IHSs), recognize each of data traffic flow 1 and data traffic flow 2 based on matches of packets provided in those data traffic flows with the details of data traffic flow 1 and data traffic flow 2 in the data traffic flow table in the switch IHS (e.g., the flow table 318 discussed above with reference to FIG. 3). Upon receipt and recognition of data traffic flow 1 and data traffic flow 2, each switch operates according to its hardware queues (programmed as per the table above) to prioritize data traffic 1 over data traffic 2, and then allocate 90% of its available bandwidth in both receiving and transmitting data traffic 1, while allocating 10% of its available bandwidth in receiving and transmitting data traffic 2. In this manner, a first QoS is provided in transmitting data traffic 1 from the endpoint IHS 206b and over the flow path to the endpoint 206a, while a second QoS is provided in transmitting data traffic 2 from the endpoint IHS 206b and over the flow path to the endpoint 206a.

The method 400 may then proceed to optional block 410 where switch IHSs in one or more flow paths may be reconfigured to provide a modified QoS for a data traffic flow associated with the flow path that includes those switch IHSs. In an embodiment, a network administrator may modify how a data traffic flow or flows are handled by the IHS network 200 simply by reconfiguring the switch IHSs in the flow path or paths associated with those data traffic flow(s) from the management IHS 202. For example, using the management IHS 202, the network administrator may change the configuration for any or all of the switch IHSs in a flow path or flow paths to change the QoS provided to one or more data traffic flows (e.g., by sending OFPT_PORT_MOD messages that include the new configuration information from the SDN controller in the management IHS 202 to each of the switch IHSs 208a-d.) A specific example is provided below in table B that illustrates the hardware queue of the switch IHS that was provided in table A above, but that that has been reprogrammed with new configuration information for its two data traffic flow (1 and 2) at optional block 410:

| cap | | 8 | | | cbs | | | 0 |
|---|---|---|---|---|---|---|---|---|
| data traffic flow | 1 | 2 | 3 | 4 | 5 | 6 | 7 | 8 |
| ets tc_tx_bw | 50 | 50 | 0 | 0 | 0 | 0 | 0 | 0 |
| ets tc_rx_bw | 50 | 50 | 0 | 0 | 0 | 0 | 0 | 0 |
| ets tc_tsa | 2 | 2 | 0 | 0 | 0 | 0 | 0 | 0 |
| ets prio_tc | 0 | 1 | 2 | 0 | 0 | 0 | 0 | 0 |

As can be seen in table B above, the hardware queue for the switch IHS has been reprogrammed with updated configuration information provided at block 410 to allocate 50% of the transmission bandwidth of the switch IHS to data traffic flow 1 (ets tc_tx_bw=50) and 50% of the transmission bandwidth of the switch IHS to data traffic flow 2 (ets tc_tx_bw=50). Similarly, the updated configuration information provided at block 406 has allocated 50% of the receiving bandwidth of the switch IHS to data traffic flow 1 (ets tc_tx_bw=50) and 50% of the receiving bandwidth of the switch IHS to data traffic flow 2 (ets tc_tx_bw=50). One of skill in the art in possession of the present disclosure will recognize that the priority of data traffic 1 and data traffic 2, relative to each other and/or other data traffic received by the switch IHS, may be changed at optional block 410 as well.

In some embodiments, switch IHSs may be added (or removed) from the IHS network 200. When a switch IHS is added to the IHS network 200, that switch IHS may register through the management network 204 with the SDN controller in the management IHS 202 similarly as described above with reference to block 402, and that switch IHS may then be determined to be part of a flow path and configured (e.g., via OFPT_PORT_MOD messages) as described above with reference to blocks 406 and 408. In addition, at any time a network administrator or other user may provide a new DCB configuration that includes, for example, a plurality of DCB configuration details that may include the identity of a new data traffic flow, a priority for that new data traffic flow, a bandwidth allocation for that new data traffic flow, a lossless behavior request for that new data traffic flow, a congestion notification request for that new data traffic flow, and/or a variety of other DCB configuration information known in the art and, in response, blocks 404-408 may be repeated to determine a flow path for the new data traffic flow and configure the switch IHSs in that flow path (i.e., with the flow details and the QoS details.)

Figure 5A:
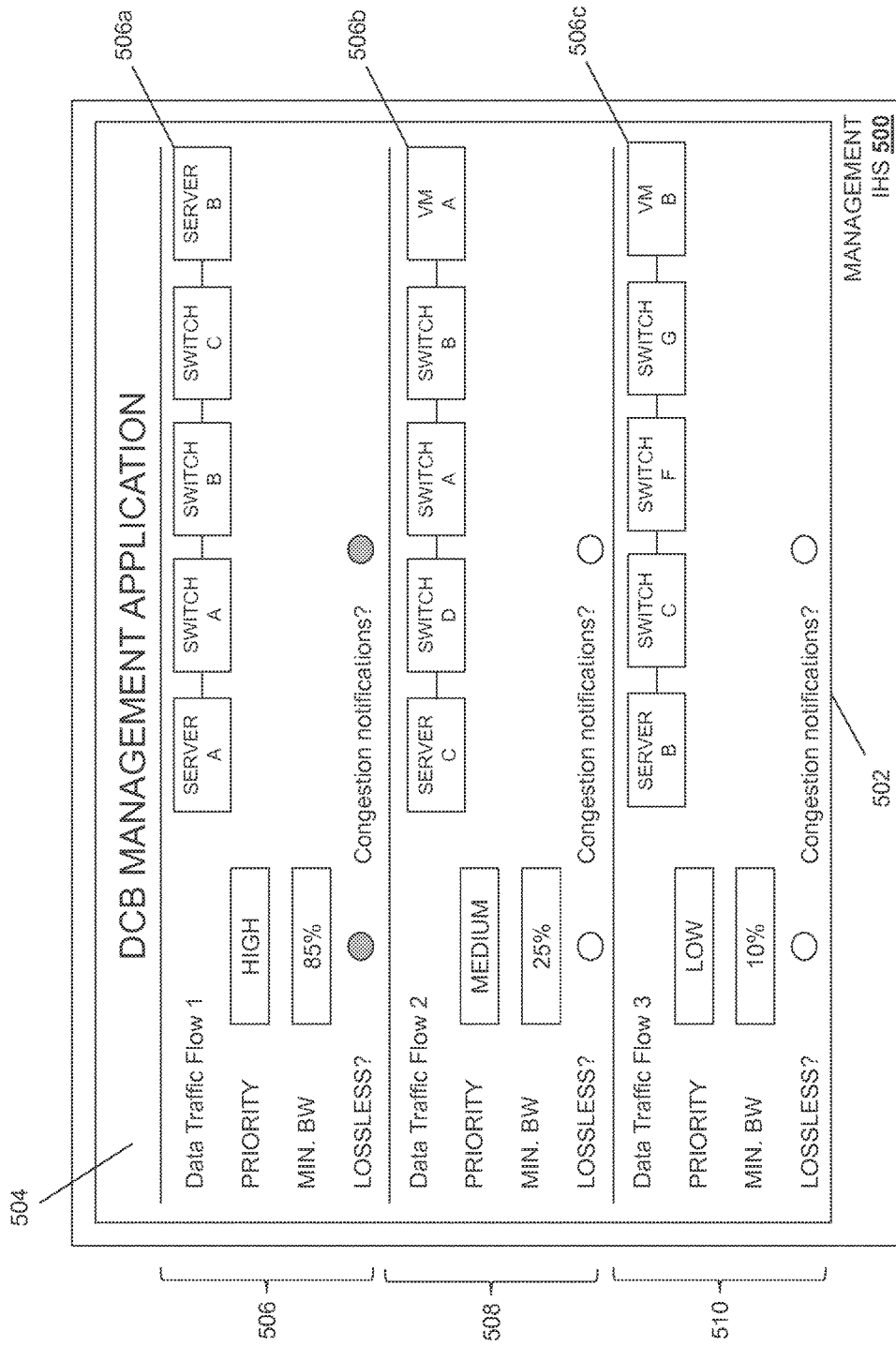
FIG. 5a is a screen shot illustrating an embodiment of a management IHS user interface for configuring/managing a DCB IHS network.
Figure 5B:
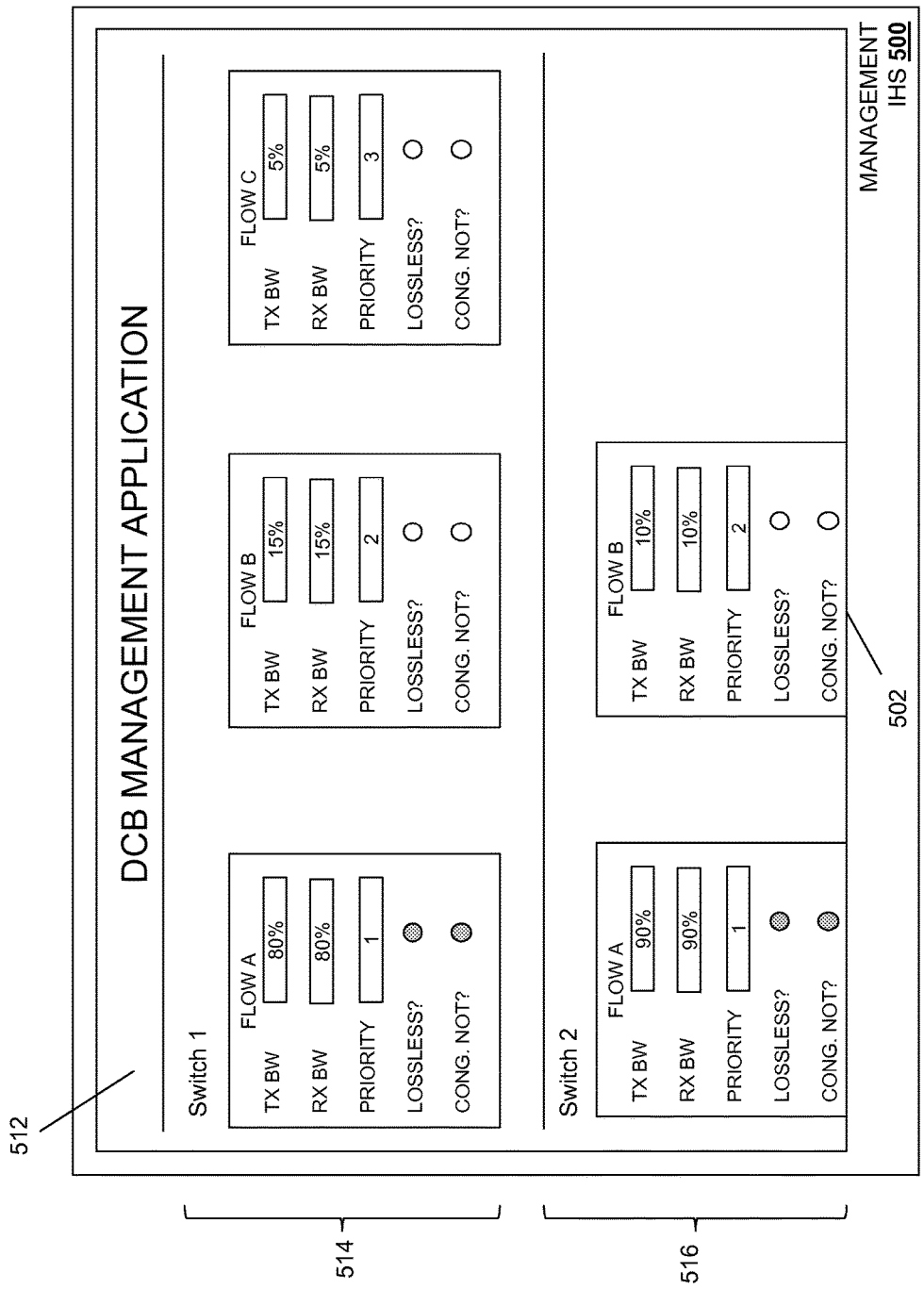
FIG. 5b is a screen shot illustrating an embodiment of a management IHS user interface for configuring/managing a DCB IHS network

Referring now to FIGS. 5a and 5b, an embodiment of a management IHS 500 is illustrated, which may be the management IHS 202 discussed above with reference to FIG. 2, that includes a display device 502 displaying screens from a DCB IHS network management application. In the embodiment illustrated in FIG. 5a, the DCB IHS network management application includes a data traffic flow management screen 504 that includes a plurality of data traffic flow sections 506, 508, and 510 each associated with a data traffic flow that may have been identified at block 404 of the method 400. Each data traffic flow section 506, 508, and 510 includes a respective flow path illustration 506a, 508b, and 510c that includes the flow path devices that were determined at block 406 for the data traffic flow associated with that data traffic flow section. Each data traffic flow section 506, 508, and 510 also includes inputs to allow a configuration for the associated data traffic flow to be provided, including a priority input, a minimum bandwidth input, a lossless selector, and a congestion notification selector. In one example of the method 400, at block 404 the data traffic flow 1 may be identified and populated in the data traffic flow section 506. At block 406, the flow path for data traffic flow 1 may then be determined and the flow path illustration 506a populated in the data traffic flow section 506. The network administrator may then use an input device on the management IHS 500 to provide inputs in the priority input, the minimum bandwidth input, the lossless selector, and/or the congestion notification selector (as illustrated) and, in response, the management IHS 500 may send the configuration information to the switch IHSs in the flow path for the data traffic flow 1 as discussed above. The method 400 may be performed similarly for each of the data traffic flow 2 and the data traffic flow 3 in the data traffic flow sections 508 and 510, respectively. Furthermore, at any time, the network administrator may use the data traffic flow management screen 504 to reconfigure switch IHSs in a flow path to change the QoS for any data traffic flow by providing inputs in the priority input, the minimum bandwidth input, the lossless selector, and/or the congestion notification selector for that data traffic flow.

In the embodiment illustrated in FIG. 5b, the DCB IHS network management application includes a switch IHS management screen 512 that includes a plurality of switch IHS sections 514 and 516 each associated with a switch IHS that is handling one or more data traffic flows. Each switch IHS sections 514 and 516 includes data traffic flow section that identifies a data traffic flow being handled by that switch, along with inputs that allow a configuration for each respective data traffic flow to be provided, including a transmission bandwidth input, a receiving bandwidth input, a priority input, a lossless selector, and a congestion notification selector. In one embodiment, any of the flow path illustrations 506a-c may be selected on the data traffic flow management screen 504 of FIG. 5a and, in response, the switch IHS management screen 512 may be provided that allows any switch in the flow path associated with the selected flow path illustration to be configured. In response to receiving inputs on the switch IHS management screen 512, the management IHS 500 operates according to block 406 of the method to send corresponding configuration information to the appropriate switch IHS. Thus, at any time, the network administrator may use the switch IHS management screen 512 to reconfigure any switch IHS in the IHS network 200 to change the QoS for any data traffic flow by providing inputs in the priority input, the minimum bandwidth input, the lossless selector, and/or the congestion notification selector for that data traffic flow.

Thus, systems and methods for providing a DCB IHS network have been described that utilize flow-based networking to configure and manage DCB in a large scale, multi-hop IHS network. One of skill in the art in possession of the present disclosure will recognize that, in fully flow-based networking environment (i.e., environments in which each switch IHS is a flow-based networking switch), the need for DCBX via link layer discovery protocols (LLDPs) is eliminated (while being partially eliminated in hybrid environments, discussed below), as the configuration of DCB is automated and managed from a central location at the management IHS. The systems and methods described herein also eliminated the need for identifying priority traffic via Priority Code Point (PCP) values (described in the IEEE 802.1p specification) in the 802.1 Tag Control Info 2 bytes header.

Referring back to FIG. 2, in some embodiments, at least one of the switch IHSs included in the flow path determined at block 406 of the method 400 may include a non-flow-based networking switch IHS. For example, for a flow path that includes the switch IHSs 208a-d, each of the switch IHSs 208a, 208b, and 208d may be flow-based networking switch IHSs, while the switch IHS 208c may be a non-flow-based networking switch IHS. In such a hybrid IHS network, the flow-based networking switch IHSs may operate to allow the method 400 discussed above by performing the tagging and untagging of Ethernet packets sent to and received from the non-flow-based networking switch IHS. For example, each of the flow-based networking switch IHSs 208a, 208b, and 208d may be configured according to the method 400, while the non-flow-based networking switch IHS 208c may be configured conventionally by a network administrator. In operation, when the switch IHS 208d receives a data traffic flow from either of the endpoint IHSs 206b or 206c, the switch IHS 208d will operate to tag Ethernet packets that are to be sent to the switch IHS 208c (e.g., to indicate the priority of those Ethernet packets), while the switch IHS 208b will operate to untag those Ethernet packets received from the switch IHS 208c before forwarding the data traffic flow to the switch IHS 208a. Thus, while the embodiments discussed above with reference to FIG. 4 were directed to a fully flow-based networking environment (i.e., each flow path determined involved Ethernet/traffic ports that were SDN capable), hybrid flow-based and non-flow-based networking environments may be enabled as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Data Center Bridging (DCB) management system, comprising
   a processing system; and
   a memory system that is coupled to the processing system and that includes instruction that, when executed by the processing system, cause the processing system to:
      receive and store a plurality of Data Center Bridging (DCB) configurations;
      detect, via a management network, a plurality of networking devices in a network;

identify a first data traffic flow that is associated with a first DCB configuration of the plurality of DCB configurations;

determine a first flow path through the network for the first data traffic flow that is provided by a first subset of the plurality of networking devices, wherein the first subset of the plurality of networking devices that provide the first flow path are selected at least in part based on those networking devices supporting DCB;

provide, through the management network to respective management ports included on each of the first subset of the plurality of networking devices that provide the first flow path, the first DCB configuration such that the first DCB configuration is not transmitted via traffic ports that are included on each of the first subset of the plurality of networking devices and that support DCB; and causing configuration each of the first subset of the plurality of networking devices that provide the first flow path using the first DCB configuration such that the traffic ports that are included on each of the first subset of the plurality of networking devices and that support DCB transmit the first data traffic flow as the first data traffic flow is forwarded along the first flow path through the network.

2. The management system of claim 1, wherein the memory system includes instruction that, when executed by the processing system, cause the processing system to:

identify a second data traffic flow that is associated with a second DCB configuration of the plurality of DCB configurations;

determine a second flow path through the network for the second data traffic flow that is provided by a second subset of the plurality of networking devices, wherein the second subset of the plurality of networking devices that provide the second flow path are selected at least in part based on those networking devices supporting DCB; and provide the second DCB configuration to each of the second subset of the plurality of networking devices that provide the second flow path such that each of the second subset of the plurality of networking devices that provide the second flow path incorporate the second DCB configuration to provide DCB according to the second DCB configuration to the second data traffic flow as the second data traffic flow is forwarded along the second flow path through the network.

3. The management system of claim 1, wherein the memory system includes instruction that, when executed by the processing system, cause the processing system to:

provide a second DCB configuration of the plurality of DCB configurations that is different than the first DCB configuration to each of the first subset of the plurality of networking devices that provide the first flow path such that each of the first subset of the plurality of networking devices that provide the first flow path incorporate the second DCB configuration to provide DCB according to the second DCB configuration to the first data traffic flow as the first data traffic flow is forwarded along the first flow path through the network.

4. The management system of claim 1, wherein the first subset of the plurality of networking devices that provide the first flow path are selected based on those networking devices supporting DCB in response to determining that each of the first subset of the plurality of networking devices includes at least one DCB capable port.

5. The management system of claim 1, wherein the first DCB configuration is a hardware queue DCB configuration that is provided for hardware queues in the first subset of the plurality of networking devices that provide the first flow path.

6. The management system of claim 1, wherein the first DCB configuration identifies the first data traffic flow, a priority for the first data traffic flow, a bandwidth allocation for the first data traffic flow, a lossless behavior request for the first data traffic flow, and a congestion notification request for the first data traffic flow.

7. A Data Center Bridging (DCB) network, comprising:

a plurality of networking devices that are connected together in a network;

a management system that is coupled to each of the plurality of networking devices via a management network and that stores a plurality of Data Center Bridging (DCB) configurations, wherein the management system is configured to identify a plurality of data traffic flows and, for each identified data traffic flow, to:

determine the data traffic flow is associated with a respective DCB configuration of the plurality of DCB configurations;

determine a flow path through the network for the data traffic flow that is provided by a subset of the plurality of networking devices, wherein the subset of the plurality of networking devices that provide the flow path are selected at least in part based on those networking devices supporting DCB;

provide, through the management network to respective management ports included on each of the subset of the plurality of networking devices that provide the flow path, the respective DCB configuration for the data traffic flow such that the respective DCB configuration is not transmitted via traffic ports that are included on each of the subset of the plurality of networking devices and that support DCB; and causing configuration of each of the subset of the plurality of networking devices that provide the flow path using the respective DCB configuration such that the traffic ports that are included on each of the subset of the plurality of networking devices and that support DCB transmit the data traffic flow as the data traffic flow is forwarded along the flow path through the network.

8. The DCB network of claim 7, wherein the management system is configured to:

provide an updated DCB configuration for a particular data traffic flow to each of the networking devices that provide a particular flow path such that each of the subset of the plurality of networking devices that provide the particular flow path incorporate the updated DCB configuration for the particular data traffic flow to provide DCB according to the updated DCB configuration to the particular data traffic flow as the particular data traffic flow is forwarded along the particular flow path through the network.

9. The DCB network of claim 7, wherein the subset of the plurality of networking devices that provide the flow path are selected based on those networking devices supporting DCB in response to determining that each of the subset of the plurality of networking devices includes at least one DCB capable port.

10. The DCB network of claim 7, wherein the respective DCB configuration is a hardware queue DCB configuration that is provided for hardware queues in the subset of the plurality of networking devices that provide the flow path.

11. The DCB network of claim 7, wherein the respective DCB configuration identifies the data traffic flow, a priority for the data traffic flow, and a bandwidth allocation for the data traffic flow.

12. The DCB network of claim 7, wherein the respective DCB configuration identifies a lossless behavior request for the data traffic flow, and a congestion notification request for the data traffic flow.

13. The DCB network of claim 7, wherein the respective DCB configuration for the data traffic flow is provided to each of the subset of the plurality of networking devices that provide the flow path using an OFPT_PORT_MOD controller command message type.

14. A method for providing Data Center Bridging (DCB) in a network, comprising:
   receiving and storing, by a management system, a plurality of Data Center Bridging (DCB) configurations;
   detecting, by the management system, a plurality of networking devices in a network, wherein the management system is coupled to each of the plurality of networking device via a management network;
   identifying, by the management system, a first data traffic flow that is associated with a first DCB configuration of the plurality of DCB configurations;
   determining, by the management system, a first flow path through the network for the first data traffic flow that is provided by a first subset of the plurality of networking devices, wherein the first subset of the plurality of networking devices that provide the first flow path are selected at least in part based on those networking devices supporting DCB;
   providing, by the management system and through the management network to respective management ports included on each of the first subset of the plurality of networking devices that provide the first flow path, the first DCB configuration such that the first DCB configuration is not transmitted via traffic ports that are included on each of the first subset of the plurality of networking devices and that support DCB; and
   causing, by the management system, configuration of each of the first subset of the plurality of networking devices that provide the first flow path using the first DCB configuration such that the traffic ports that are included on each of the first subset of the plurality of networking devices and that support DCB transmit the first data traffic flow as the first data traffic flow is forwarded along the first flow path through the network.

15. The method of claim 14, further comprising:
   identifying, by the management system, a second data traffic flow that is associated with a second DCB configuration of the plurality of DCB configurations;
   determining, by the management system, a second flow path through the network for the second data traffic flow that is provided by a second subset of the plurality of networking devices, wherein the second subset of the plurality of networking devices that provide the second flow path are selected at least in part based on those networking devices supporting DCB; and
   providing, by the management system, the second DCB configuration to each of the second subset of the plurality of networking devices that provide the second flow path such that each of the second subset of the plurality of networking devices that provide the second flow path incorporate the second DCB configuration to provide DCB according to the second DCB configuration to the second data traffic flow as the second data traffic flow is forwarded along the second flow path through the network.

16. The method of claim 14, further comprising:
   providing, by the management system, a second DCB configuration of the plurality of DCB configurations that is different than the first DCB configuration to each of the first subset of the plurality of networking devices that provide the first flow path such that each of the first subset of the plurality of networking devices that provide the first flow path incorporate the second DCB configuration to provide DCB according to the second DCB configuration to the first data traffic flow as the first data traffic flow is forwarded along the first flow path through the network.

17. The method of claim 14, wherein the first subset of the plurality of networking devices that provide the first flow path are selected based on those networking devices supporting DCB in response to determining that each of the first subset of the plurality of networking devices includes at least one DCB capable port.

18. The method of claim 14, wherein the first DCB configuration is a hardware queue DCB configuration that is provided for hardware queues in the first subset of the plurality of networking devices that provide the first flow path.

19. The method of claim 14, wherein the first DCB configuration identifies the first data traffic flow, a priority for the first data traffic flow, a bandwidth allocation for the first data traffic flow, a lossless behavior request for the first data traffic flow, and a congestion notification request for the first data traffic flow.

20. The method of claim 14, wherein the first DCB configuration for the first data traffic flow is provided to each of the first subset of the plurality of networking devices that provide the first flow path using an OFPT_PORT_MOD controller command message type.

* * * * *